United States Patent
Silander et al.

(10) Patent No.: US 12,487,321 B2
(45) Date of Patent: Dec. 2, 2025

(54) ACTIVE RECEIVER DISTORTION SUPPRESSION IN A RADAR SYSTEM

(71) Applicant: SAAB AB, Linköping (SE)

(72) Inventors: Anders Silander, Gothenburg (SE); Milena Anguelova, Lindome (SE)

(73) Assignee: SAAB AB, Linköping (SE)

( * ) Notice: Subject to any disclaimer, the term of this patent is extended or adjusted under 35 U.S.C. 154(b) by 553 days.

(21) Appl. No.: 17/607,912

(22) PCT Filed: May 2, 2019

(86) PCT No.: PCT/SE2019/050391
§ 371 (c)(1),
(2) Date: Nov. 1, 2021

(87) PCT Pub. No.: WO2020/222685
PCT Pub. Date: Nov. 5, 2020

(65) Prior Publication Data
US 2022/0214422 A1    Jul. 7, 2022

(51) Int. Cl.
*G01S 7/02* (2006.01)
*G01S 7/285* (2006.01)
*G01S 13/02* (2006.01)

(52) U.S. Cl.
CPC ............. *G01S 7/023* (2013.01); *G01S 7/285* (2013.01); *G01S 13/02* (2013.01)

(58) Field of Classification Search
CPC ........... G01S 7/023; G01S 7/285; G01S 13/02
See application file for complete search history.

(56) References Cited

U.S. PATENT DOCUMENTS

| | | | |
|---|---|---|---|
| 5,291,209 A | | 3/1994 | Evans et al. |
| 5,557,641 A | * | 9/1996 | Weinberg ................. G01S 7/285 375/295 |
| 6,297,772 B1 | * | 10/2001 | Lewis ....................... G01S 7/36 342/162 |
| 6,834,073 B1 | * | 12/2004 | Miller ..................... G01S 7/023 375/E1.001 |
| 9,791,564 B1 | * | 10/2017 | Harris ................... G01S 13/931 |
| 2008/0242245 A1 | | 10/2008 | Aparin |

(Continued)

FOREIGN PATENT DOCUMENTS

| | | |
|---|---|---|
| EP | 3110018 A1 | 12/2016 |
| EP | 3173812 A1 | 5/2017 |
| EP | 3499731 A1 | 6/2019 |

OTHER PUBLICATIONS

International Search Report and Written Opinion mailed Feb. 18, 2020 for International Application No. PCT/SE2019/050391, 15 pages.

(Continued)

*Primary Examiner* — Marcus E Windrich
(74) *Attorney, Agent, or Firm* — Sage Patent Group

(57) ABSTRACT

A method for operating a radar in a radar system to cancel an external disturbance in a received signal is provided. The method comprises receiving a signal at the receiving antenna, receiving the signal at the control unit, identifying interfering signal, generating a correction signal and feeding the correction signal. The correction signal is arranged to dampen the interfering signal in the frequency span in the received signal. Thereby the external disturbance is reduced.

21 Claims, 2 Drawing Sheets

(56) References Cited

U.S. PATENT DOCUMENTS

| | | | |
|---|---|---|---|
| 2009/0051581 A1* | 2/2009 | Hatono | G01S 7/285 |
| | | | 342/134 |
| 2009/0186582 A1 | 7/2009 | Muhammad et al. | |
| 2009/0213770 A1 | 8/2009 | Mu | |
| 2009/0256749 A1 | 10/2009 | Falk | |
| 2010/0159866 A1 | 6/2010 | Fudge et al. | |
| 2011/0171920 A1 | 7/2011 | Kim et al. | |
| 2012/0295565 A1* | 11/2012 | Goodman | G01S 7/023 |
| | | | 455/296 |
| 2014/0194073 A1 | 7/2014 | Wyville et al. | |
| 2017/0343661 A1* | 11/2017 | Morita | G01S 7/282 |
| 2017/0343662 A1* | 11/2017 | Boutin | G01S 7/023 |
| 2018/0306901 A1* | 10/2018 | Pernstål | G01S 7/0232 |
| 2019/0056476 A1* | 2/2019 | Lin | G01S 7/021 |
| 2019/0113600 A1* | 4/2019 | Melzer | G01S 13/343 |
| 2019/0293749 A1* | 9/2019 | Itkin | G01S 13/931 |
| 2020/0278420 A1* | 9/2020 | Papotto | G01S 7/023 |

OTHER PUBLICATIONS

Second Written Opinion mailed Mar. 12, 202 for International Application No. PCT/SE2019/050391, 7 pages.

International Preliminary Report on Patentability mailed Jul. 2, 2021 for International Application No. PCT/SE2019/050391, 8 pages.

Response to Written Opinion filed Feb. 25, 2021 for International Application No. PCT/SE2019/050391, 2 pages.

Extended European Search Report mailed Nov. 7, 2022 for European Patent No. 19926934.1, 9 pages.

Farina, A.; "Chapter 9: Electronic Counter-Countermeasures" from Radar Handbook (2nd Edition), edited by Merrill I. Skolnik; Jan. 1, 1990; 35 pages.

Notice of Preliminary Rejection mailed Jul. 22, 2024 for Korean Patent Application No. 10-2021-7039331, 15 pages (includes English translation).

Office Action mailed Mar. 11, 2025 for Korean Patent Application No. 10-2021-7039331, 11 pages (includes English translation).

Communication pursuant to Article 94(3) EPC mailed May 15, 2025 for European Patent Application No. 19926934.1, 7 pages.

* cited by examiner

ACTIVE RECEIVER DISTORTION SUPPRESSION IN A RADAR SYSTEM

CROSS-REFERENCE TO RELATED APPLICATIONS

This application is a 35 U.S.C § 371 national stage application for International Application No. PCT/SE2019/050391, entitled "ACTIVE RECEIVER DISTORTION SUPPRESSION IN A RADAR SYSTEM", filed on May 2, 2019, the disclosures and contents of which are hereby incorporated by reference in their entireties.

TECHNICAL FIELD

The present invention relates to methods for operating a radar system. The present invention further relates to a radar system for executing such methods and a program, a computer device readable medium carrying such a program and a control unit enabling that such methods are executed by the radar system.

BACKGROUND ART

The concept of radar was discovered late 19th century and was further developed during the first and second world wars where radars where used in order to detect e.g. hostile aircrafts. One example of radars are pulsed radars. A pulsed radar operates at two operation modes, a transmission mode where pulsed, high power radio frequency signals, referred to as transmission signals, are transmitted and a reception mode where the reflected echo of the transmitted transmission signals, which are referred to as reflection signals, reflected signals or reply signals, are received. The transmission signals are transmitted by means of transmission means and the reflected signals are received by means of receiving means. When a transmission signal is transmitted the transmission signal will give rise to a number of reflected signals originating from all structures, such as e.g. vehicles, humans, and houses, generating a reflected signal and towards which the transmitted signal may echo. By means of commonly known methods for filtering out relevant targets from not relevant targets, such as e.g. background scatter and like, the reflected signals resulting from the relevant targets can be analysed. Such commonly known methods may e.g. be based on recognition of certain structures, detecting abnormalities in a known environment or applying various signal filters, but also methods exists. To give yet one example, prior art comprises various methods for filtering out relevant targets from not relevant targets based on e.g. target characteristics. Such methods will not be addressed more herein but are considered to be part of common general knowledge.

Since only a small portion of a transmitted high power radio frequency signal is reflected when a target is hit the transmission signal has significantly higher power than the reflected reply signal. Thus, for a radar system designed to detect small targets far away, the receiving means configured to detect the reflected signals have to be able to detect significantly lower powers than what is transmitted by the transmission means.

For any radar application, a receiving means operating in proximity of a transmission means may experience a distortion in the received signal due to such transmission means. This may be addressed by automatic gain control, by which the gain of the receiving means is adjusted so that background, distortion and other interfering signals can be reduced. By this stronger echoes can be detected and the functionality be improved.

However, while automatic gain control may bring improvements, there are drawbacks. The sensitivity of the radar system implementing automatic gain control is reduced. This problem is aggravated in modern multichannel wideband radar systems due to their sensitivity in a larger angular and frequency region. Thus, there is a need for further improvements in a radar system.

SUMMARY OF THE INVENTION

An object of the present disclosure is to provide a method of operating a radar system which overcomes, or at least alleviates, the problems known with commonly known radar systems and how they are operated. The object is achieved by a method according to claim 1. Further advantageous aspects of methods of how to operate such radar system are disclosed in the following description and the dependent claims.

The present invention also relates to a radar system configured for executing such methods of operating a radar system. Such radar system is defined by claims 16 to 18 and further advantageous aspects of such radar system are disclosed by claims 17 to 21.

Further, the present invention relates to a program comprising program code for performing the steps of any aspect, or a combination of aspects, of operating a radar system. The present invention also refers to a computer device readable medium carrying a program comprising such program code and to a control unit being configured to perform the steps of any aspect, or a combination of aspects, of operating a radar system.

According to a first aspect, a method for operating a radar in a radar system to cancel an external disturbance in a received signal is provided. The radar system comprises a transmitting antenna, a receiving antenna and a control unit. The transmitting antenna is configured to transmit radio signals. The receiving antenna is configured to receive radio signals on at least one channel. The method comprises the steps of receiving a signal at the receiving antenna, receiving the signal at the control unit, identifying an interfering signal, generating a correction signal and feeding the correction signal. The signal received by the receiving antenna comprises reflected signals and interfering signals. The signal received at the control unit is in the analogue domain. Identifying the interfering signal is done in a frequency span of the signal. Generating the correction signal is in the frequency span and based on the signal. Feeding the correction signal is to the at least one channel in the analogue domain. The correction signal is arranged to dampen the interfering signal in the frequency span in the received signal. Thereby the external disturbance is reduced.

By feeding the correction signal into the at least one channel receiving radio signals at the receiving antenna, so that the resulting signal is within the dynamic range, active cancellation of external interfering signal is achieved. Thereby the lower sensitivity of an automatic gain control implementation may be avoided. By this, an improved system having a reduced influence from interfering signals can achieved and thereby detection may be enabled where disturbance signals otherwise would cause distortion. For example, such interfering signals can originate from having a receiving device in proximity to one or more transmitting devices, or from active measures. Distortion may for example be caused by an interfering signal having an amplitude outside a dynamic range of the receiver or a component of the receiver.

The signal received on at least one channel by the receiving antenna is a radio signal comprising both reflected signals and interfering signals. The reflected radio signals may be reflections of a transmission signal emitted from the transmitting antenna. The reflected radio signals are generated when a transmitted transmission signal hits a target against which the transmitted transmission signal can be reflected, these reflected radio signals are referred to as reflected signals. The reflected radio signals may be received together with interfering radio signals.

The receiving antenna that is configured to receive radio signals on at least one channel receives the reflected radio signals together with the interfering radio signals in a composite radio signal or radio signal. The received radio signal is output as an electrical signal within the system that is received at the control unit. The signal may be transmitted between the receiving antenna and the control unit as an analogue or digital signal. The signal transmitted between the receiving antenna and the control unit may be the same signal as the radio signal received by the receiving antenna, but having another transport medium, namely an electrical one or another suitable for transport within the radar system. The signal transmitted between the receiving antenna and the control unit may also be based on the radio signal received by the receiving antenna, but both having another transport medium, namely an electrical one or another transport medium suitable for transport within the radar system. An additional filter or modulation may be applied when utilizing another transport medium.

The term signal applies to radio signals, electrical signals and/or digital signals. The signal as such may be transmitted and received in either mode of transmission.

The receiving antenna may e.g. comprise a receiving means, configured to receive reflected signals, signal processing means, configured to process received reflected signals, and other means providing functionalities necessary and/or desirable when receiving or processing reflected signals. The processing of the reflected signals may e.g. comprise amplifying, dividing or applying different signal filters in order to be able to access information from the received reflected signals.

In embodiments, the generation of the correction signal may be performed in the control unit. The generation of the correction signal may also be performed in a signal generator. The signal generator may be a signal generator dedicated for generation of the correction signal or a general signal generator that may be utilized to generate a correction signal. For example, the signal generator may be a signal generator arranged to generate transmission signals or radar transmission signals. By this, equipment that typically is available in a radar system may be utilized for a described embodiment, thereby decreasing the work needed to implement an improved method.

In embodiments, the correction signal may be generated by filtering the signal.

In embodiments, the correction signal may be generated from the signal by cancelling the signal outside of the frequency span and shifting the phase on the signal in the frequency span.

Cancellation of the signal outside of the frequency span as comprised in generation of the correction signal may be outside the frequency span of the interfering signal.

For example, generating the correction signal may comprise utilizing a band pass filter and a phase shift.

In embodiments, the phase-shift may be frequency dependent.

In embodiments, identifying the interfering signal, generating the correction signal and feeding the correction signal may form a feedback loop.

By feeding a correction signal into the receiver and applying a negative feedback loop active cancellation of interfering signals may be implemented at respective channel. For example, the interfering signal may be filtered out from the received signal. This filtered signal may be injected as a correction signal in a negative feedback loop, thereby cancelling the disturbance signal and by this improving the performance of the system.

In embodiments, the signal may be received on a guard channel and the at least one channel that the correction signal may be fed to is different than the guard channel. The guard channel may have a wider dynamic range than the operating channels of the receiving antenna. Further, the guard channel may have a lower gain than the operating channels of the receiving antenna. The guard channel may also be linear. The guard channel may be used to further analyse and filter out the disturbance signal. By this, the signal received from the guard channel having a wider span without the risk of distortion can be used in identifying the interfering signal. Thereby providing an improved signal and by this improving the capability for identifying the interfering signal in the received signal.

The guard channel may be implemented in a stand alone channel or in a channel that is in stand by during the time at which the guard channel is to be active. The guard channel may be implemented in a dedicated antenna or in an antenna of the radar system having other uses that is suitable to be arranged as the receiving antenna.

In embodiments, the at least one channel fed with the correction signal may comprise a channel by which the signal is received. For example, the method may be implemented in a pulsed radar system, the receiving and transmitting may then alternate on the same transmit receive means. Thereby the correction signal that may be based on a signal received during a receiving mode of operation may be fed to the same channel operating in a transmission mode of operation.

In embodiments, the correction signal may be fed at the receiving antenna.

In embodiments, identifying the interfering signal may be performed in the analogue domain.

In embodiments, identifying the interfering signal may be performed in the digital domain.

In embodiments, the method may further comprise converting the interfering signal from the analogue domain to the digital domain before identifying the interfering signal.

In embodiments, the method may further comprise converting the interfering signal from the analogue domain to the digital domain after identifying the frequency span of the interfering signal or while generating the correction signal. In this case, both analogue and digital methods may be combined. For example, the frequency span of the interfering signal may be identified in the analogue domain and an analogue band pass filter be applied while additional filtering, such as phase shifting, may be performed in the digital domain. For another example, the frequency span of the interfering signal may be identified in the digital domain and a digital band pass filter be applied while additional filtering, such as phase shifting, may be performed in the analogue domain.

In embodiments, generating the correction signal may be performed in the analogue domain.

By this, improvements can be made in cases where an amount or character of noise would limit the performance of a digital implementation. For an example, this may be the case of non-linear receiver characteristics at high effects in combination with a limited performance in an analogue to digital converter. This may result in spurious signals. Spurious signals may in turn may lead to false alarms and limit the performance, if it is not taken care of.

In embodiments, generating the correction signal may be performed in the digital domain.

In embodiments, the method may further comprise converting the correction signal from the digital domain to the analogue domain.

In embodiments, identifying the frequency span of the interfering signal may comprise finding a frequency span where a signal strength of the signal is over a threshold.

In embodiments, the radar system may be a pulsed radar system.

A pulsed radar system may operate in a transmission mode in which the system transmit transmission signals by means of a transmitting antenna, and in a reception mode, during which receiving means of the pulsed radar system enable the pulsed radar system to receive, or listens to, reflections of the transmitted transmission signals. The reflections of the transmission signals, which are generated when a transmitted transmission signal hits a target against which the transmitted transmission signal can be reflected, are referred to as reflected signals.

The transmitting antenna may be configured to transmit transmission signals, and having signal processing means, configured to process transmission signals, and other means providing functionalities necessary and/or desirable when transmitting or processing transmission signals. The processing of the transmission signals may e.g. comprise amplifying, dividing or applying different signal filters in order to manipulate the transmission signals.

The receiving means may for example comprise a receiving antenna, configured to receive reflected signals, and having signal processing means, configured to process received reflected signals, and other means providing functionalities necessary and/or desirable when receiving or processing reflected signals. The processing of the reflected signals may e.g. comprise amplifying, dividing or applying different signal filters in order to be able to access information from the received reflected signals.

When operating in transmission mode the transmission means are activated and the receiving means are deactivated. Activation and deactivation of the transmission means and receiving means may also be referred to that the transmission means are connected or disconnected. Obviously, the same applies for the receiving means. Thus, in transmission mode, even if a transmitted transmission signal hits a target, which generates a reflected signal, and that reflected signal reaches the receiving antenna, the receiving means are not able to detect the reflected signal since the receiving means are deactivated or disconnected.

According to another aspect, a radar system for transmitting and receiving radar signals is provided. The radar system comprises a transmitting antenna, a receiving antenna, a signal generator and a control unit. The transmitting antenna is configured to transmit radio signals. The receiving antenna is configured to receive radio signals on at least one channel, wherein the signals comprises reflected signals and interfering signals. The signal generator is configured to generate a correction signal. The control unit is configured to receive the signal from the receiving antenna, wherein the signal is in the analogue domain, identify the interfering signal in a frequency span of the signal and to provide the correction signal to the signal generator based on the signal. The signal generator is configured to feed the correction signal to the at least one channel in the analogue domain, wherein the correction signal is arranged to dampen the interfering signal in the frequency span in the received signal.

In embodiments, the radar may be a pulsed radar.

A pulsed radar system may be arranged to operate in a transmission mode in which the system transmit transmission signals by means of a transmitting antenna, and be arranged to in a reception mode, during which receiving means of the pulsed radar system enable the pulsed radar system to receive, or listens to, reflections of the transmitted transmission signals. The reflections of the transmission signals, which are generated when a transmitted transmission signal hits a target against which the transmitted transmission signal can be reflected, are referred to as reflected signals.

The transmitting antenna may be configured to transmit transmission signals, signal processing means, configured to process transmission signals, and other means providing functionalities necessary and/or desirable when transmitting or processing transmission signals. The processing of the transmission signals may e.g. comprise amplifying, dividing or applying different signal filters in order to manipulate the transmission signals.

The receiving means may for example comprise a receiving antenna, configured to receive reflected signals, signal processing means, configured to process received reflected signals, and other means providing functionalities necessary and/or desirable when receiving or processing reflected signals. The processing of the reflected signals may e.g. comprise amplifying, dividing or applying different signal filters in order to be able to access information from the received reflected signals.

When operating in transmission mode the transmission means are activated and the receiving means are deactivated. Activation and deactivation of the transmission means and receiving means may also be referred to by that the transmission means are connected or disconnected. Obviously, the same applies for the receiving means. Thus, in transmission mode, even if a transmitted transmission signal hits a target, which generates a reflected signal, and that reflected signal reaches the receiving antenna, the receiving means are not able to detect the reflected signal since the receiving means are deactivated or disconnected.

In embodiments, the signal generator may also be configured to generate a transmission signal to the transmitting antenna.

By this, the signal generator may be configured to generate and/or process transmission signals. The signal generator may comprise other means providing functionalities necessary and/or desirable when generating or processing transmission signals. The generation and/or processing of the transmission signals may for example comprise amplifying, dividing or applying different signal filters in order to manipulate the transmission signals.

According to another aspect, a program for a computer device comprising program code for performing the method steps of any one aspect or embodiment when the program is run on a computer device is provided.

In embodiments the program for a computer device comprising program code may be arranged to perform the method steps of a combination of aspects or embodiments when the program is run on a computer device.

According to another aspect, a computer device readable medium carrying a program comprising program code for performing the method steps of any one aspect or embodiment when the program is run on a computer device is provided.

In embodiments the computer device readable medium carrying a program comprising program code may be arranged to perform the method steps of a combination of aspects or embodiments when the program is run on a computer device.

According to another aspect, a control unit for controlling a method for operating a radar system is provided, the control unit being configured to perform the method steps of the method according to any aspect or embodiment.

In embodiments the control unit for controlling a method for operating a radar system may be arranged to perform the method steps of a combination of aspects or embodiments. By this, the method steps of a combination of aspects or embodiments may be implemented in software to demand minimal additional hardware to a radar system, thereby simplifying implementation in a radar system.

The term transmitting antenna is an example of a transmission means.

The term receiving antenna is an example of a receiving means.

The signal generating means, such as a signal generator, may be part of the transmission means and the signal processing means may be part of the receiving means. The transmitting antenna and the receiving antenna may be one antenna, which in turn may be an antenna array, which can operate both in transmission mode and in reception mode, preferably by applying a duplexer or like, or may be two separate antennas or antenna arrays.

A radar system according to the present invention is suitable for a wide array of radar applications, such as imaging radar applications and applications for detecting a target, and possibly estimating the kinematic characteristics of such target.

It should be noted that when herein referring to antenna this is considered to include antennas with just one antenna element as well as array antennas, comprising a number of interacting antenna elements, also referred to antenna array.

The system may be adapted to carry out any method described in disclosed embodiments.

BRIEF DESCRIPTION OF THE DRAWINGS

The invention is described in the following illustrative and non-limiting detailed description of exemplary embodiments, with reference to the appended drawings, wherein.

All figures are schematic, not necessarily to scale, and generally only show parts that are necessary in order to elucidate the invention, wherein other parts may be omitted or merely suggested. Throughout the figures the same reference signs designate the same, or essentially the same features.

DETAILED DESCRIPTION

The present invention can be used to cancel an external disturbance in a received signal in a radar system feeding a correction signal to at least one channel of a radar which overcome or at least mitigate the problems of the prior art and with an improved functionality.

Figure 1:
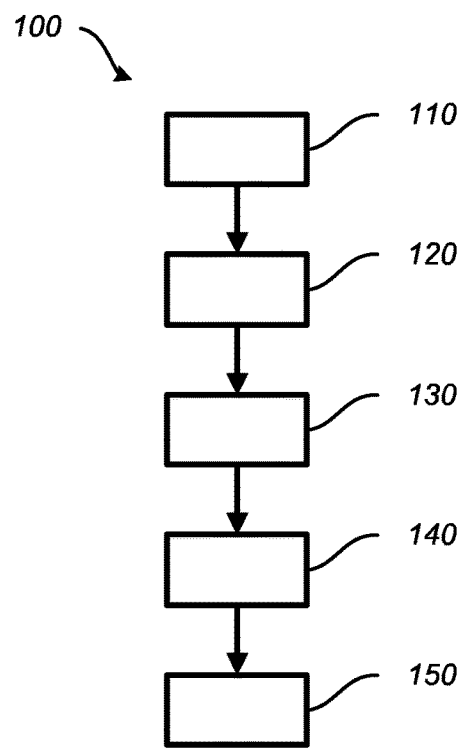
FIG. 1 is a schematic illustration of a method for operating a radar in a radar system according to a first aspect of the present invention.

The invention is described in the following illustrative and non-limiting detailed description of exemplary embodiments, with reference to the appended drawings, wherein:

FIG. 1 shows a schematic illustration of a method 100 for operating a radar in a radar system to cancel an external disturbance in a received signal, according to an embodiment of the present invention. The method comprises receiving 110 a signal at a receiving antenna, wherein the signal comprises reflected signals and interfering signals, and receiving 120 from a receiving antenna, the signal at a control unit, wherein the signal is in the analogue domain. The method further comprise identifying 130 the interfering signal in a frequency span of the signal and generating 140 a correction signal in the frequency span, based on the signal. The method further comprise feeding 150 the correction signal to at least one channel in the analogue domain, wherein the correction signal is arranged to dampen the interfering signal in the received signals frequency span in the received signal.

The method operates a radar system at least comprising the transmitting antenna that is configured to transmit radio signals, the receiving antenna that is configured to receive radio signals on at least one channel, and the control unit.

By feeding the correction signal into the at least one channel receiving radio signals at the receiving antenna, so that the resulting signal is within the dynamic range, active cancellation of external interfering signal is achieved. Thereby the lower sensitivity of an automatic gain control implementation may be avoided.

The receiving antenna that is configured to receive radio signals on at least one channel receives the reflected radio signals together with the interfering radio signals in a composite radio signal or radio signal. The received radio signal is output as an electrical signal within the system that is received at the control unit. The signal may be transmitted between the receiving antenna and the control unit as an analogue or digital signal. In case of transmission between the receiving antenna and the control unit as a digital signal, the method may also comprise a step of converting the analogue signal from the receiving antenna to a digital signal by the use of an analogue to digital converter. Similarly, should the signal be transmitted between the receiving antenna and the control unit as an optical signal, the method may also comprise a step of an additional conversation.

The signal transmitted between the receiving antenna and the control unit is the same signal as the radio signal received by the receiving antenna, having another transport medium, for an example an electrical one, an optical one, or another suitable for transport within the radar system.

The method may also comprise a step of applying an additional filter or modulation on the signal transmitted between the receiving antenna and the control unit.

The generation of the correction signal may be performed in the control unit. The generation of the correction signal may also be performed in a signal generator. The signal generator may for example be a signal generator dedicated for generation of the correction signal or a general signal generator that may be utilized to generate a correction signal.

The method may also comprise a step of filtering the signal to generate the correction signal. The filtering of the signal can for example be made by cancelling the signal outside of the frequency span and shifting the phase on the signal in the frequency span. By cancelling the information outside frequency spans results in a filtered signal having no or close to no information outside the frequency span. The filtering may for example comprise utilizing a band pass filter and a phase shift. The phase shift may be frequency dependent.

The method described may be performed at each individual transmit/receive channel and the interfering signal is thereby filtered out, phase-shifted and subsequently (partially) cancelled out in a negative feedback loop. The detection and analysis of the interfering signal may be done in the digital domain. The band-pass filtering and phase-shifting to obtain a correction signal can be performed on the received signal in either the analogue domain or the digital domain. A digitized correction signal is converted back to the analogue domain. The analogue correction signal is fed into respective operating channel for complete/partial quenching of the interfering signal.

Figure 2:
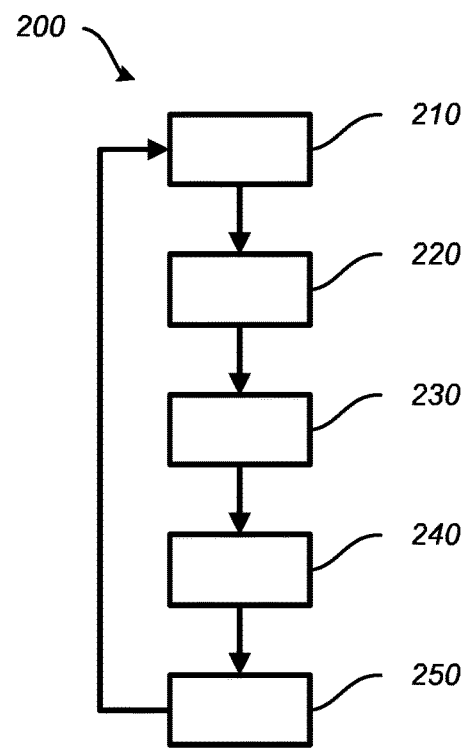
FIG. 2 is a schematic illustration of a method according to one embodiment of the invention.

FIG. 2 shows a schematic illustration of a method 200 for operating a radar in a radar system in a feedback loop to cancel an external disturbance in a received signal, according to an embodiment of the present invention. The method comprises receiving 210 a signal at a receiving antenna, wherein the signal comprises reflected signals and interfering signals, and receiving 220 from a receiving antenna, the signal at a control unit, wherein the signal is in the analogue domain. The method further comprise identifying 230 the interfering signal in a frequency span of the signal and generating 240 a correction signal in the frequency span, based on the signal. The method further comprise feeding 250 the correction signal to at least one channel in the analogue domain, wherein the correction signal is arranged to dampen the interfering signal in the received signals frequency span in the received signal. As illustrated, identifying the interfering signal, generating the correction signal and feeding the correction signal forms a feedback loop.

The feedback loop may also for example comprise the steps of analysing the received signal in the digital domain, where a signal received in the analogue domain may be converted to the digital domain, identifying the interfering signal in a frequency span of the received signal. The interfering signal may for example be filtered out by means of a band pass filter at the frequency span.

Filtering out the interfering signal may be performed in the analogue domain on the received signal or in the digital domain on the converted received signal.

The feedback loop may further comprise the step of determining a frequency dependent phase shift to obtain a correction signal that is in reversed phase in comparison to received interfering signal. The frequency dependent phase shift may be dependent on known phase shifts from the analogue electronic components involved in the loop, such as for example analogue to digital converters, band pass filters, digital to analogue converters and/or similar. The frequency dependent phase shift that such analogue electronic components contribute with may be obtained from a table. Such table may be obtained from a previously performed calibration. The calibration may be performed in the system or before installation.

The feedback loop may further comprise the step of shifting the phase of the filtered out interfering signal by the determined frequency dependent phase shift. By this obtaining a narrow band correction signal.

Shifting the phase of the filtered out interfering signal by the determined frequency dependent phase shift may be performed in the analogue domain on the received signal or in the digital domain on the converted received signal. Should the correction signal be obtained in the digital domain, the determined correction signal may be converted from the digital domain to the analogue domain.

The method may also comprise a step of converting the correction signal from the digital domain to the analogue domain.

The feedback loop may further comprise the step of feeding the correction signal to the receiving antenna, at least partially cancelling out interfering signals such that the external disturbance is reduced and the remaining incoming signal becomes positioned within the dynamic range of the receiving means.

The correction signal may be configured to compensate for the detected disturbance signal both in amplitude and phase. The correction signal may be fed back with reversed phase and same or a similar amplitude as the interfering signal.

The feedback loop may be performed on an individual channel or on a plurality of channels.

Further, the signal may also be received on a guard channel that is different from the at least one channel that the correction signal is fed to. The guard channel may for example have a wider dynamic range than the operating channels of the receiving antenna. Further, the guard channel may have a lower gain than the operating channels of the receiving antenna. The guard channel may also be linear. The guard channel may be used to further analyse and filter out the disturbance signal. By this, the signal received from the guard channel having a wider span without the risk of distortion can be used in identifying the interfering signal.

The guard channel may be implemented in a stand alone channel or in a channel that is in stand by during the time at which the guard channel is to be active. The guard channel may be implemented in a dedicated antenna or in an antenna of the radar system having other uses that is suitable to be arranged as the receiving antenna.

The method may also be implemented in a pulsed radar system and the at least one channel fed with the correction signal may by this also comprise a channel by which the signal is received. Thereby the correction signal that may be based on a signal received during a receiving mode of operation may be fed to the same channel operating in a transmission mode of operation while operating in a pulsed radar system.

The step of identifying the interfering signal may be performed in the analogue or the digital domain. In case of identifying the interfering signal in a domain other than the received signal, the method may also comprise a step of converting the received signal to that domain.

The step of generating the correction signal may be performed in the digital domain.

The step of identifying the frequency span of the interfering signal may comprise finding a frequency span where a signal strength of the signal is over a threshold.

The method described may be performed at each individual transmit/receive channel and the interfering signal is thereby filtered out, phase-shifted and subsequently (partially) cancelled out in a negative feedback loop. The detection and analysis of the interfering signal may be done in the digital domain. The band-pass filtering and phase-shifting to obtain a correction signal can be performed on the received signal in either the analogue domain or the digital domain. A digitized correction signal is converted back to the analogue domain. The analogue correction signal is fed into respective operating channel for complete/partial quenching of the interfering signal.

Figure 3A:
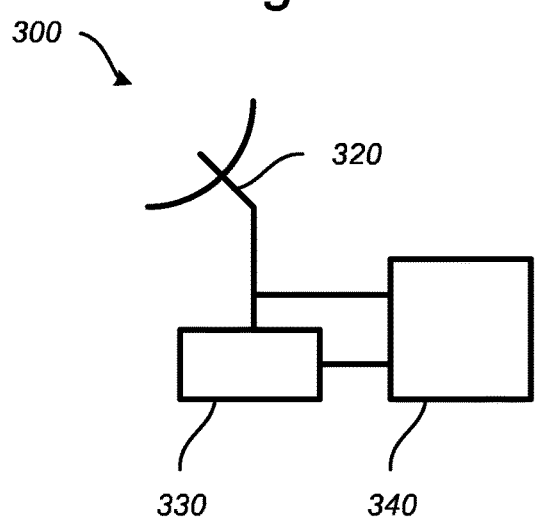
FIG. 3a is a schematic illustration of a radar system according to a second aspect of the present invention.

FIG. 3a shows a schematic illustration of a radar system 300 receiving radar signals, according to an embodiment of the present invention.

The radar system 300 comprises a receiving antenna 320, a signal generator 330 and a control unit 340. The receiving antenna 320 is configured to receive radio signals on at least one channel, wherein the signals comprises reflected signals and interfering signals, and is in connection with the control unit 340 and the signal generator 330. The signal generator 330 may also be comprised in the control unit 340. The signal generator 330 is configured to generate a correction signal and is in connection with the control unit 340. The control unit 340 is configured to receive the signal from the receiving antenna 320, wherein the signal is in the analogue domain, identify the interfering signal in a frequency span of the signal and to provide the correction signal to the signal generator 330 based on the signal. The signal generator 330 is configured to feed the correction signal to the at least one channel in the analogue domain, wherein the correction signal is arranged to dampen the interfering signal in the frequency span in the received signal. While the illustration shows one specific antenna units, this is merely an example. Several antenna constructions may be envisions, such as multiple antennas operating as a receiving antenna. The antennas as such may be of several different types depending on the utilization.

Figure 3B:
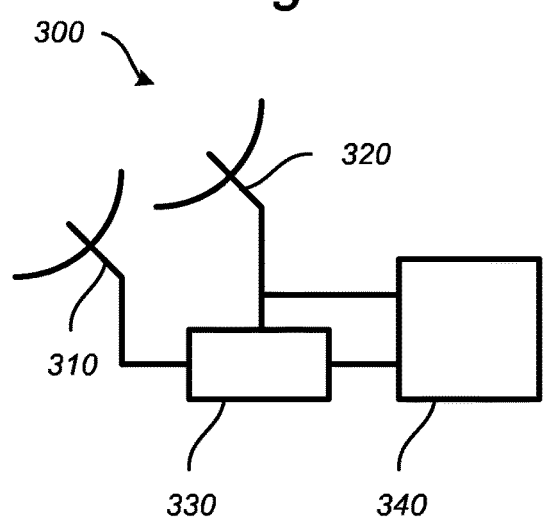
FIG. 3b is a schematic illustration of a radar system according to one embodiment of the invention.

The signal generator may also be configured to also generate a transmission signal to the transmitting antenna, as illustrated in FIG. 3b.

FIG. 3b shows a schematic illustration of a radar system 300 for transmitting and receiving radar signals, according to an embodiment of the present invention.

The radar system 300 comprises a transmitting antenna 310, a receiving antenna 320, a signal generator 330 and a control unit 340. The transmitting antenna 310 is configured to transmit radio signals and is in connection with the signal generator 330. The receiving antenna 320 is configured to receive radio signals on at least one channel, wherein the signals comprises reflected signals and interfering signals, and is in connection with the control unit 340 and the signal generator 330. The signal generator 330 is configured to generate a correction signal and is in connection with the control unit 340. The control unit 340 is configured to receive the signal from the receiving antenna 320, wherein the signal is in the analogue domain, identify the interfering signal in a frequency span of the signal and to provide the correction signal to the signal generator 330 based on the signal. The signal generator 330 is configured to feed the correction signal to the at least one channel in the analogue domain, wherein the correction signal is arranged to dampen the interfering signal in the frequency span in the received signal. While the illustration shows two specific antenna units, this is merely an example. Several antenna constructions may be envisions, such as a non limiting example a pulsed antenna operating at a single antenna, multiple antennas operating as a transmitting antenna and/or multiple antennas operating as a receiving antenna. The antennas as such may be of several different types depending on the utilization.

The radar system 300 may be a pulsed radar system where the transmitting antenna 310 may be configured to transmit transmission signals, and having signal processing means, configured to process transmission signals, and other means providing functionalities necessary and/or desirable when transmitting or processing transmission signals. The processing of the transmission signals may e.g. comprise amplifying, dividing or applying different signal filters in order to manipulate the transmission signals. The processing of the transmission signals may for example be performed in the control unit 340.

The receiving means may for example comprise a receiving antenna 320, configured to receive reflected signals, and having signal processing means, configured to process received reflected signals, and other means providing functionalities necessary and/or desirable when receiving or processing reflected signals. The processing of the reflected signals may e.g. comprise amplifying, dividing or applying different signal filters in order to be able to access information from the received reflected signals. The processing of the received signals may for example be performed in the control unit 340.

The signal generator 330 may be configured to generate a correction signal. The control unit 340 is configured to receive the signal from the receiving antenna 320, wherein the signal as received by the control unit is in the digital domain, identify the interfering signal in a frequency span of the signal and to provide the correction signal to the signal generator based on the signal. The signal generator is configured to feed the correction signal to the at least one channel in the analogue domain, wherein the correction signal is arranged to dampen the interfering signal in the frequency span in the received signal.

Figure 4:
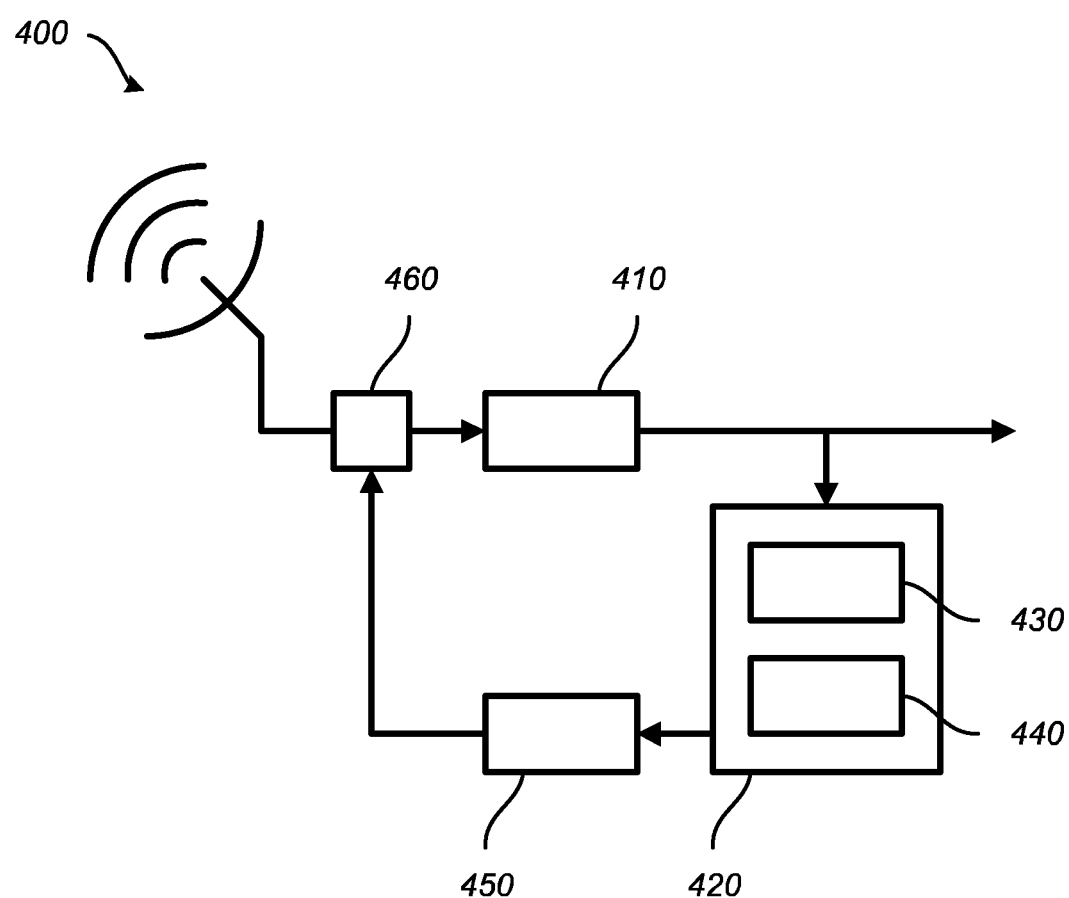
FIG. 4 is a schematic illustration of a method according to one embodiment of the invention.

FIG. 4 shows a schematic illustration of a radar system 400 for receiving radar signals, according to an embodiment of the present invention.

The radar system 400 comprises a receiving antenna, analogue to digital converter 410, a signal generator 450, a control unit 420 and a digital to analogue converter 450. The receiving antenna is configured to receive radio signals on at least one channel, wherein the signals comprises reflected signals and interfering signals.

The signal from the receiving antenna is converted to a digital signal in the analogue to digital converter 410. The analogue to digital converter 410 may be a stand alone unit or integrated in the control unit or the signal generator. The digital signal is sent to processing in the control unit 420. The processing comprise the steps of identifying a frequency span of the digital signal that comprises the interfering signal and generating a digital correction signal in the frequency span, based on the signal. The identification of the frequency span of the digital signal that comprises the interfering signal is here performed by means for identification 430 within the control unit 430 and the digital correction signal is here generated by a signal generator 440 within the control unit 420.

The digital correction signal is then converted to an analogue correction signal in a digital to analogue converter 450. The analogue correction signal is then fed to the at least one channel in the analogue domain at a feeding point 460. The feeding point 460 may be a specific unit, or integrated into the receiving antenna.

The radar may also send the signal from the at least one channel in the digital domain onwards for construction of a radar image, where the sent signal may comprise the fed analogue correction signal. The signal from the at least one channel that is sent onwards for construction of a radar image may also be in the in the analogue domain, the signal is then sent onwards between the analogue to digital converter 410 and the feeding point 460.

The radar system 400 may be a pulsed radar.

The method described may be performed at each individual transmit/receive channel and the interfering signal is thereby filtered out, phase-shifted and subsequently (partially) cancelled out in a negative feedback loop. The detection and analysis of the interfering signal may be done in the digital domain. The band-pass filtering and phase-shifting to obtain a correction signal can be performed on the received signal in either the analogue domain or the digital domain. A digitized correction signal is converted back to the analogue domain. The analogue correction signal is fed into respective operating channel for complete/partial quenching of the interfering signal.

While specific embodiments have been described, the skilled person will understand that various modifications and alterations are conceivable within the scope as defined in the appended claims.

The invention claimed is:

1. A method for operating a radar in a radar system to cancel an external disturbance in a received signal, wherein the radar system comprises:
   a transmitting antenna, configured to transmit radio signals;
   a receiving antenna, configured to receive radio signals on at least one channel; and
   a control unit; and
   wherein the method comprises the steps of:
      receiving a signal at the receiving antenna, wherein the signal comprises reflected signals and interfering signals;
      receiving, from the receiving antenna, the signal at the control unit,
   wherein the signal is in an analogue domain;
      identifying the interfering signal in a frequency span of the signal;
      generating a correction signal in the identified frequency span, based on the signal, wherein the correction signal is generated from the signal by cancelling the signal outside of the identified frequency span and shifting a phase on the signal in the frequency span;
      feeding the correction signal to the at least one channel in the analogue domain, wherein the correction signal is arranged to dampen the interfering signal in the identified frequency span in the received signal, whereby the external disturbance is reduced.

2. The method according to claim 1, wherein the correction signal is generated by filtering the signal.

3. The method according to claim 1, wherein the phase-shift is frequency dependent.

4. The method according to claim 1, wherein identifying the interfering signal, generating the correction signal and feeding the correction signal forms a feedback loop.

5. The method according to claim 1, wherein the at least one channel fed with the correction signal comprises a channel by which the signal is received.

6. The method according to claim 1, wherein the correction signal is fed at the receiving antenna.

7. The method according to claim 1, wherein identifying the interfering signal is performed in the analogue domain.

8. The method according to claim 1, wherein identifying the interfering signal is performed in the digital domain.

9. The method according to claim 8, further comprising converting the interfering signal from the analogue domain to the digital domain before identifying the interfering signal.

10. The method according to claim 1, wherein generating the correction signal is performed in the analogue domain.

11. The method according to claim 1, wherein generating the correction signal is performed in the digital domain.

12. The method according to claim 11, further comprising converting the correction signal from the digital domain to the analogue domain.

13. The method according to claim 1, wherein identifying the frequency span of the interfering signal comprises finding a frequency span where a signal strength of the signal is over a threshold.

14. The method according to claim 1, wherein the radar system is a pulsed radar system.

15. A radar system for transmitting and receiving radar signals according to claim 1, wherein the radar system comprises:
    a transmitting antenna, configured to transmit radio signals;
    a receiving antenna, configured to receive radio signals on at least one channel, wherein the signals comprise reflected signals and interfering signals;
    a signal generator, configured to generate a correction signal; and;
    a control unit, configured to receive the signal from the receiving antenna, wherein the signal is in an analogue domain, identify the interfering signal in a frequency span of the signal and to provide the correction signal to the signal generator based on the signal, wherein the correction signal is generated from the signal by cancelling the signal outside of the identified frequency span and shifting a phase on the signal in the frequency span;
    wherein the signal generator is configured to feed the correction signal to the at least one channel in the analogue domain, wherein the correction signal is arranged to dampen the interfering signal in the identified frequency span in the received signal.

16. The radar system according to claim 15, wherein the radar is a pulsed radar.

17. The radar system according to claim 16, wherein the signal generator also is configured to generate a transmission signal to the transmitting antenna.

18. A non-transitory computer storage medium storing computer-executable instructions which, when executed in a processor communicatively connected to the radar system, causes the radar system to carry out the method steps of claim 1.

19. A control unit for controlling a method for operating a radar system, the control unit being configured to perform the method steps of the method according to claim 1.

20. The method according to claim 1, wherein the signal is received on a guard channel and the at least one channel that the correction signal is fed to is different than the guard channel.

21. The radar system according to claim 15, wherein the signal is received on a guard channel and the at least one channel that the correction signal is fed to is different than the guard channel.

* * * * *